United States Patent [19]

Costantino et al.

[11] 4,195,798
[45] Apr. 1, 1980

[54] UNIVERSAL TOW TARGET ADAPTER

[75] Inventors: G. Costantino, Hatboro; D. Carroll, Doylestown, both of Pa.

[73] Assignee: The United States of America as represented by the Secretary of the Navy, Washington, D.C.

[21] Appl. No.: 943,255

[22] Filed: Sep. 15, 1978

[51] Int. Cl.² .............................................. B64D 3/02
[52] U.S. Cl. ..................................... 244/1 TD; 244/3; 273/360; 403/78; 403/165; 403/320
[58] Field of Search ................ 244/1TD, 3; 114/249, 114/250, 251; 273/105.3; 403/78, 79, 165, 318, 319, 320, 356; 24/115 R, 115A

[56] References Cited

U.S. PATENT DOCUMENTS

| 2,821,419 | 1/1958 | Walton | 403/319 |
| 3,088,693 | 5/1963 | Brown | 244/3 |
| 3,100,093 | 8/1963 | McQuillen et al. | 244/3 |
| 3,102,743 | 9/1963 | Niskin | 403/78 |
| 3,135,511 | 6/1964 | Norman et al. | 244/3 |
| 3,490,799 | 1/1970 | Shreeve | 403/78 |
| 3,736,010 | 5/1973 | Larkin | 403/320 |

FOREIGN PATENT DOCUMENTS 1394534  2/1965  France ................... 273/105.3

Primary Examiner—Charles E. Frankfort
Attorney, Agent, or Firm—R. S. Sciascia; Henry Hansen

[57] ABSTRACT

A reel launcher having a saddle operationally deployable beneath an aircraft for carrying and towing an aerial tow target. The tow target is connected to the tow cable by an adapter which includes a notch for registration with a latch in the launcher. The adapter includes a nose section and one of a plurality of end fittings specially formed to engage a corresponding connection in different tow targets. The length of the adapter is adjustable by a threaded connection between the nose section and the end fitting which may be locked with the notch in proper alignment by a slot, key and notch arrangement between the two ends. Thus, a single nose section operable with a launcher may be used with different end fittings and tow targets with no other modifications.

11 Claims, 5 Drawing Figures

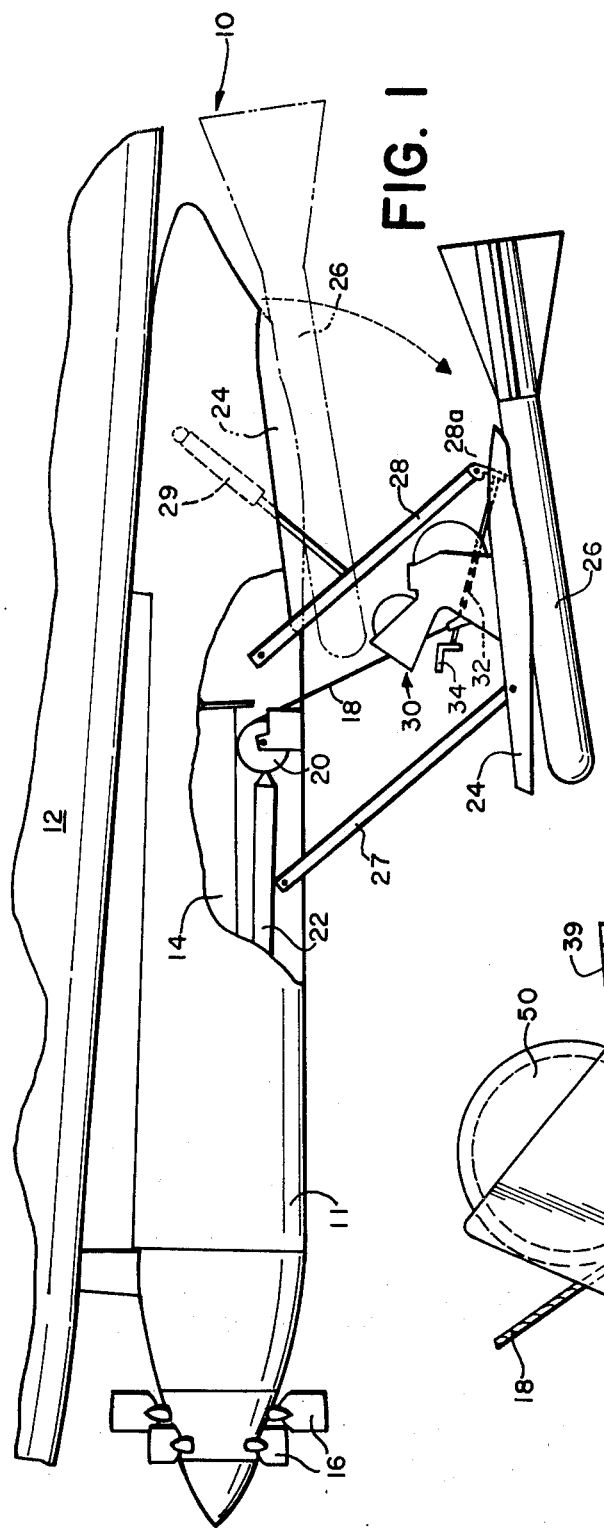
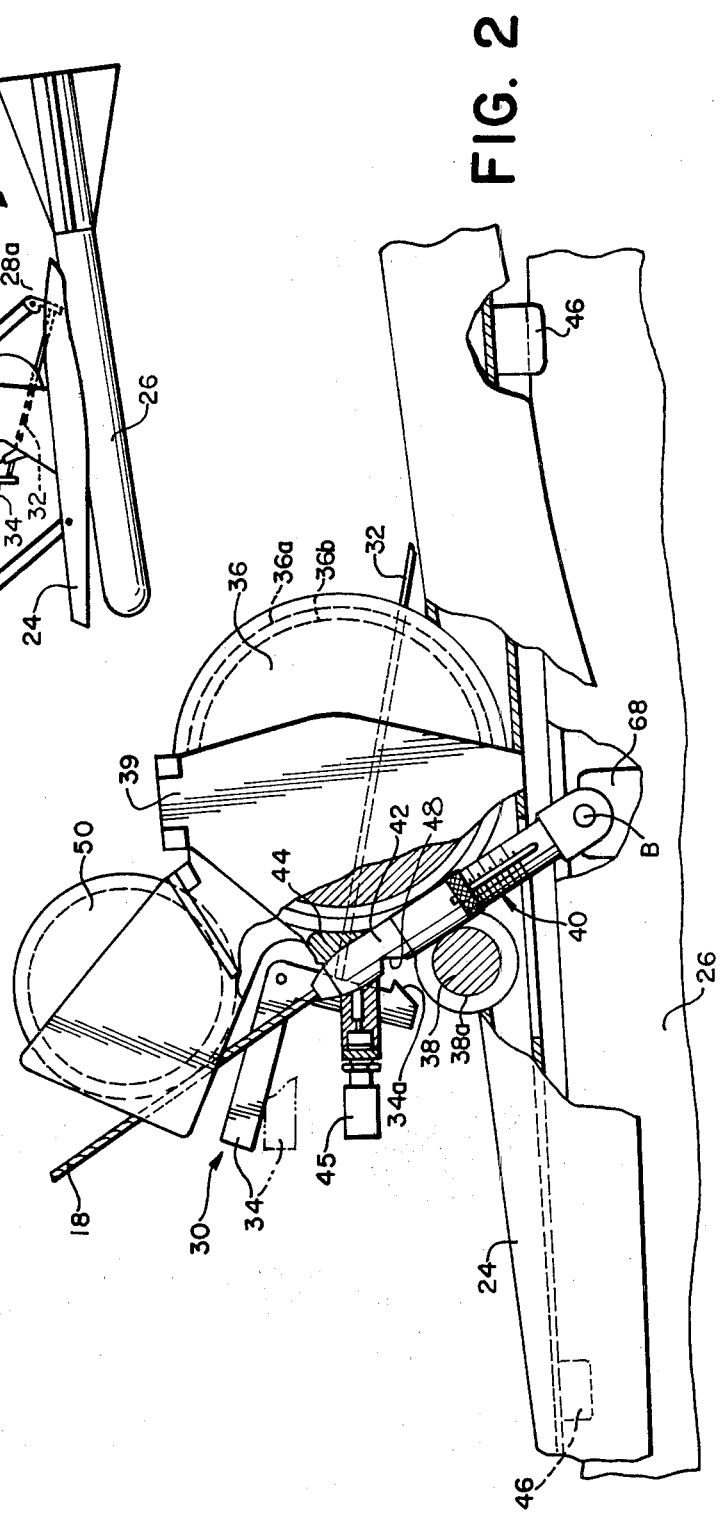

UNIVERSAL TOW TARGET ADAPTER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to tractor aircraft tow reel launcher systems, and more particularly to adapters for securing tow targets in reel launchers.

Reel launchers, such as the RMK-19/A47U-3, are externally mounted on tractor aircraft for carrying and towing aerial targets of numerous sizes and configurations. The target is secured beneath the tractor aircraft by a pawl or latch mechanism in the launcher which engages a notch in the adapter connecting the target to the tow cable. Each target configuration requires a different adapter for securing it within the launcher when fully retrieved because of differences in target connecting lugs and their locations. When a different tow target is to be used, the one adapter must be disassembled and the tow cable terminal, usually secured by swaging, removed. Then the other adapter can be assembled about a new terminal which has been secured to the end of the tow cable. This procedure is considerably time consuming and requires an inventory of an assortment of complete high-cost adapters, and swaging and cable cutting tools. This is particularly undesirable where aircraft operational facilities are limited in equipment and manpower.

SUMMARY OF THE INVENTION

Accordingly, it is an object of the present invention to provide a tow target adapter which will enable tow targets of different configurations and sizes to be used on a single tow reel launcher of the type having a latch mechanism for locking the target thereunder. Other objects are to provide a tow target adapter which can be readily modified to accommodate different tow targets without special tools and equipment, which obviates complete disassembly and reassembly of the adapter and tow cable terminal in order to use a different tow target, and which enables precise alignment and positive securement of the adapter to the launcher when the tow target is fully retrieved. Still other objects are to provide a tow target adapter which is fully adjustable for obtaining a desired holding force between the tow target and the launcher when secured therein, and which ensures precise alignment of the adapter with the latch mechanism in the launcher for positive engagement.

Briefly, these and other objects are accomplished by a tow target adapter having a nose section threadingly connected to an end fitting specially formed at the distal end to pivotally engage one of a multiplicity of different configurations of tow targets. A slot and key at the threaded connection of the nose section insures alignment of the end fitting and the launcher latch mechanism when the target is fully seated beneath the launcher. A collar threadingly connected about the end fitting retains the key in place, and an elastomeric element bonded to the threads of the end fitting frictionally locks the collar in place.

For a better understanding of these and other objects and aspects of the invention, reference may be made to the following detailed description taken in conjunction with the accompanying drawings wherein:

BRIEF DESCRIPTION OF THE DRAWINGS

FIG. 1 is a schematic representation in elevation viewed from port side of an aerial tow target reel launcher system employing an adapter according to the present invention;

FIG. 2 is an enlarged representation of the launcher system of FIG. 1 including the adapter;

DESCRIPTION OF THE PREFERRED EMBODIMENT

Figure 3:
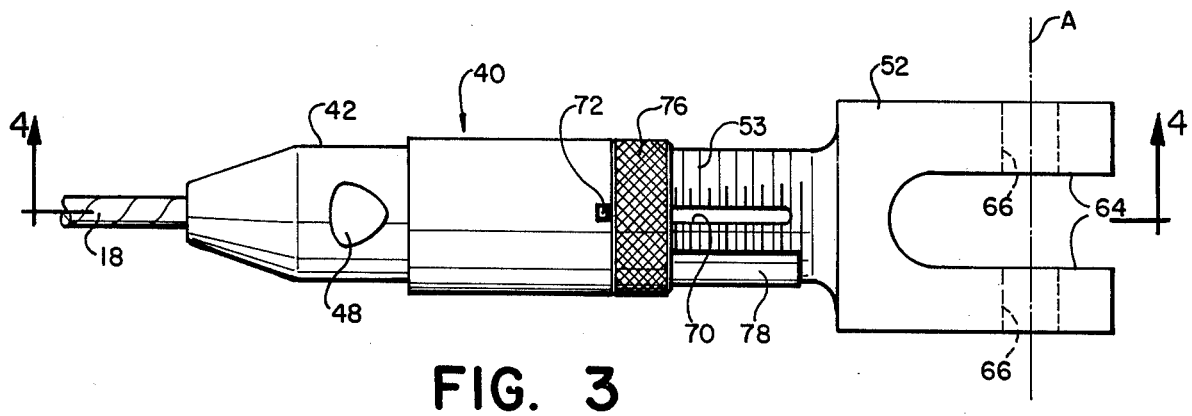
FIG. 3 is a more detailed longitudinal view of the adapter of FIG. 2.

Referring now to the drawings wherein like characters designate like or corresponding parts throughout the several views, there is shown in FIG. 1 an operationally deployed tow target reel launcher 10, viewed from the port side, fixed to the lower surface 12 of an aircraft. Launcher 10 includes an enclosure 11 containing a cable spool 14 rotatably driven by ram air at variable pitch blades 16. A tow cable 18 is level wound on spool 14 by a sheave 20 and transversing screw 22. A saddle 24, shown by solid lines in the deployed position, and by broken lines in the retracted position, is formed on its lower surface to receive a cylindrical tow target 26, and is pivotally connected to enclosure 11 by a boom assembly 28 and support rod 27. A pneumatic actuator 29 connected between enclosure 11 and boom 28 provides the power for selectively deploying the saddle 24.

The tow target 26 is held in the saddle 24 by a target latching assembly 30 which is actuated by a release rod 32 pivotally connected at one end to a swivel latch 34 and at the other end to crank arm 28a extending from boom 28 at the pivotal connection thereof at the saddle 24. As better seen in the view of FIG. 2, latching assembly 30 includes a pair of saddle sheaves 36 and 38 rotatably supported by side plates 39 in a vertical plane through the longitudinal axis of tow target 26 when fully seated in saddle 24. Sheaves 36 and 38 have adjacent grooves 36a and 38a for receiving an adapter 40 which connects between cable 18 and tow target 26. A nose section 42 of adapter 40 is received in an adapter stop 44 and prevents further upward travel. An electrical "TARGET IN" switch 45 provides an audible or visible signal when the adapter 40 is fully seated within stop 44. Elastic bumpers 46 maintain a compression fit of the tow target 26 within the saddle 24.

Swivel latch 34 is pivotally connected to plates 39 and includes a pawl 34a which is held by release rod 32 out of registry with a notch 48 in adapter 40 when the launcher 10 is fully deployed. Rod 32 will cause pawl 34a to engage notch 48 when the saddle 24 is retracted approximately halfway. As will be seen hereinbelow, the adapter may be adjusted to maintain precise alignment at the point of latching.

When spool 14 pays cable 18 out, adapter 40 will lower out from grooves 36a and 38a, and permit cable 18 to be received in a recessed groove 36b of sheave 36. A spacer sheave 50 rotatably mounted between plates 39 also receives cable 18 to maintain positive reeving about level wind sheave 20.

Figure 4:
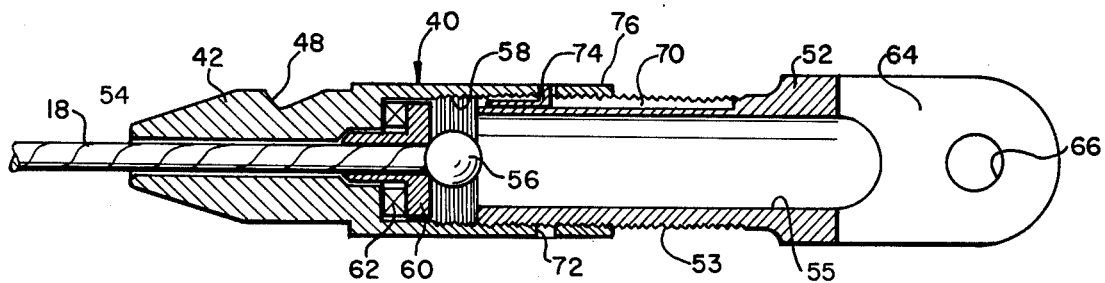
FIG. 4 is a longitudinal cross-section view of the adapter of FIG. 2 taken along the line 4—4 of FIG. 3.
Figure 5:
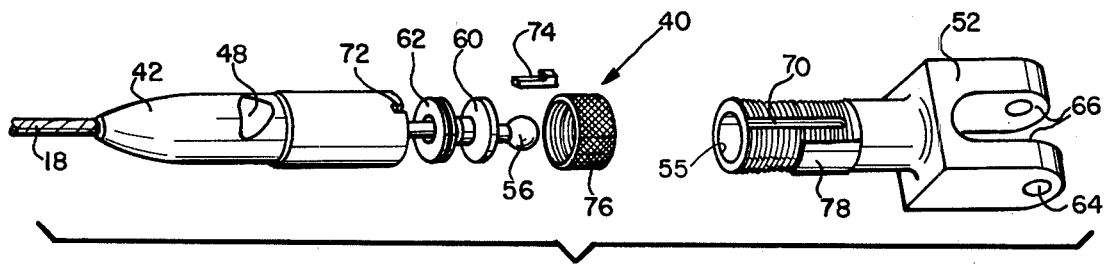
FIG. 5 is an exploded view in perspective of the adapter of FIG. 2.

Referring now to FIGS. 3, 4 and 5, adapter 40 comprises a cylindrical nose section 42 and a target end fitting 52 having a shank portion 53 threadingly engaged along the cylindrical axis thereof. Notch 48 is formed on one side of section 42 with sufficient depth and slope as to ensure positive engagement of pawl 34a. Cable 18 passes through a hole 54 in section 42 and terminates with a swaged ball 56 in an enlarged cavity 58 of section 42. A bushing 60 and thrust bearing 62 about cable 18 a the ball 56 provide for frictionless rotation of the cable 18 within the nose section 42.

The distal end of fitting 52 in the illustrated embodiment of the invention, forms a bifurcated clevis 64 with holes 66 on a transverse axis A for connecting to a mating lug 68 on a corresponding transverse axis B (FIG. 2) of the tow target 26. Of course it is understood that the configuration of the distal end of fitting 52 will change according to the lug configuration of the tow target 26. FIGS. 4 and 5 clearly illustrate a hole 55 extending through the target end fitting 52; the hole 55 being of sufficient diameter to permit the cable 18 and swage ball 56 to pass therethrough and thereby permit installation or replacement of the ball without disassembling the adapter 40. To ensure that the notch 48 will always register with the pawl 34a of the latching assembly 30, when the tow target 26 is fully seated in the saddle 24, key slot 70 along the length of threaded shank 53 and one of diametrically opposite key notches 72 at the threaded end of nose section 42 are held in alignment by a key 74. However, the end fitting 52 may be turned in or out of nose section 42 for a desired overall length and locked at 180° increments of rotation. Key 74 is held in place by lock collar 76 threaded about shank 53 for turning up to the threaded end of nose section 42. An elastomeric element 78, such as nylon, is bonded or otherwise secured along the threads of shank 53 and frictionally locks collar 76 against the nose section 42 and key 74.

It should now be apparent that a single nose section 42 can be used with a plurality of end fittings similar to fitting 52 but configured for a particular tow target lug. Regardless of the fitting configuration, the overall length of the adapter may be adjusted for a desired loading of the tow target in the launcher, and the adapter notch alignment precisely maintained for positive latching. No replacement of swaged balls is required at the cable terminal in order to change adapters, thus accomplishing changes very rapidly. Lower costs for inventory are realized since only a portion of the adapter may need to be changed with a target change.

It will be understood that various changes in the details, steps and arrangement of parts, which have been herein described and illustrated in order to explain the nature of the invention, may be made by those skilled in the art within the principle and scope of the invention as expressed in the appended claims.

What is claimed is:

1. A universal tow target adapter for precise alignment with a latch mechanism of a reel laucher, comprising:
   a cylindrical nose section having a coaxial aperture extending into the forward end for receiving the trailing end of a tow cable from the launcher and terminating in an annular seat for resisting forward movement of a flange means at the trailing end of the cable, said nose section being tapered at the forward end and having a first external notch on one side only for engaging the latch mechanism of the launcher, said nose section further having a second notch at the rearward end aligned with said first notch;
   an end fitting threadingly coupled at one end to the rearward portion of said nose section for adjusting the overall length of said adapter, and formed at the other fitting end to be connected to a tow target, said fitting having a slot along the threaded portion positioned to ensure a precise rotational alignment of said first and second notches with said end fitting;
   a key slidingly received in said second notch and said slot for locking and preventing relative coaxial rotation of said section and said fitting; and
   locking means coupled to said end fitting for securing said key in said second notch and said slot.

2. A universal adapter according to claim 1 where said nose section includes an element formed to be secured to the end of the cable, and thrust bearing means operatively connected between said element and the wall of said cavity.

3. A universal adapter according to claim 2 wherein said key includes a first portion slidingly received in said slot and a second portion received in said second notch.

4. A universal adapter according to claim 3 wherein said locking means comprises:
   a collar threadingly engaged to said end fitting for retaining said key in said second notch and said slot; and
   an elastomeric element bonded to the threads of said end fitting and frictionally restraining said collar from rotation.

5. An improved universal adapter according to claim 2 wherein said end fitting includes a hole for passing said element therethrough.

6. In an aerial tow target system having a tow cable deployable from a reel launcher carried by a tractor aircraft, said cable having a flange means at the trailing end, an improved adapter connected between the trailing end of the cable and a target, and a latch mechanism in the launcher for engaging the adapter to secure the target in the launcher when fully retrieved, wherein the improved adapter comprises:
   a cylindrical nose section having a coaxial aperture extending into the forward end for receiving the trailing end of the cable and terminating in an annular seat for resisting forward movement of said flange means, an external notch on one side thereof, and an internally threaded rearward portion; and
   an end fitting threadingly coupled to the rearward portion of said nose section and formed to be directly connected to the target for adjusting the longitudinal and rotational position of said fitting relative to the notch to ensure precise alignment with the latch mechanism at the point of full retrieval of the adapter and target; and
   locking means operatively connected to said nose section and to said end fitting for maintaining the position of said notch relative to the end fitting.

7. An improved adapter according to claim 6 wherein said locking means further comprises:
   a longitudinal groove formed in the threaded portion of said end fitting;

a recess in the rearward end of said nose section alignable with said groove at predetermined intervals of adjustment;

a key slidable in said groove and said recess when aligned for preventing relative rotation of said nose section and said end fitting; and collar means threadingly coupled to the threaded portion of said end fitting for securing said key in said groove and said recess.

8. An improved adapter according to claim 7 wherein said flange means includes a rotatable element formed to be secured to the end of the cable, and thrust bearing means operatively connected between said element and the annular seat of said nose section.

9. An improved adapter according to claim 8 wherein said key includes a first portion received in said groove and a second portion received in said recess.

10. An improved universal adapter according to claim 9 wherein said locking means further comprises:

an elastomeric element bonded to the threaded portion of said end fitting for frictionally restraining said collar from relative movement.

11. An improved universal adapter according to claim 8 wherein said end fitting includes a hole for passing said element therethrough.

* * * * *